US012585981B2

(12) United States Patent
Schulz

(10) Patent No.: US 12,585,981 B2
(45) Date of Patent: Mar. 24, 2026

(54) MANAGING AN INSTALLED BASE OF ARTIFICIAL INTELLIGENCE MODULES

(71) Applicant: ABB SCHWEIZ AG, Baden (CH)

(72) Inventor: Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 1137 days.

(21) Appl. No.: 17/381,240

(22) Filed: Jul. 21, 2021

(65) Prior Publication Data

US 2021/0350282 A1     Nov. 11, 2021

Related U.S. Application Data

(63) Continuation of application No. PCT/EP2020/051049, filed on Jan. 16, 2020.

(30) Foreign Application Priority Data

Jan. 24, 2019    (EP) .................................... 19153608

(51) Int. Cl.
*G06N 20/00*          (2019.01)
(52) U.S. Cl.
CPC .................................... *G06N 20/00* (2019.01)
(58) Field of Classification Search
CPC .................................................... G06N 20/00
See application file for complete search history.

(56) References Cited

U.S. PATENT DOCUMENTS

| | | |
|---|---|---|
| 5,787,138 A | 7/1998 | Ocieczek et al. |
| 6,507,803 B1 | 1/2003 | Eickmeyer et al. |

(Continued)

FOREIGN PATENT DOCUMENTS

| | | |
|---|---|---|
| CN | 103917166 A | 7/2014 |
| CN | 107527124 A | 12/2017 |

(Continued)

OTHER PUBLICATIONS

Weiss et al., A Survey of Transfer Learning (Year: 2016).*

(Continued)

*Primary Examiner* — Tamara T Kyle
*Assistant Examiner* — Jacqueline C. Meyer
(74) *Attorney, Agent, or Firm* — Fitch Even Tabin & Flannery LLP

(57)          ABSTRACT

A computer-implemented method for managing an installed base of multiple artificial intelligence (AI) modules, each AI module transforming input data into output data by an internal processing chain, the input data including data that characterize a state and/or the behavior, of at least one physical plant, apparatus, or system, the behavior of the internal processing chain being determined by a set of configuration parameters trainable based on training input data and corresponding reference data to which the internal processing chain is to map the training input data, the method including: obtaining, from multiple AI modules and/or domains in which the AI modules are applied, pairs of input data and corresponding output data, and/or pairs of training input data and corresponding reference data, and/or (Continued)

configuration parameters, the data and/or parameters relating to same or sufficiently similar operating situations of the AI modules according to a predetermined quantitative similarity criterion.

18 Claims, 2 Drawing Sheets

(56) References Cited

U.S. PATENT DOCUMENTS

| | | | | |
|---|---|---|---|---|
| 7,558,719 | B1 * | 7/2009 | Donlin | G06F 30/3312 |
| | | | | 716/106 |
| 2016/0217388 | A1 * | 7/2016 | Okanohara | G06N 20/00 |
| 2016/0378926 | A1 | 12/2016 | Baluta et al. | |
| 2017/0011280 | A1 | 1/2017 | Soldevila et al. | |
| 2017/0032279 | A1 | 2/2017 | Miserendino et al. | |
| 2018/0260414 | A1 | 9/2018 | Gordo Soldevila | |

FOREIGN PATENT DOCUMENTS

| | | | | |
|---|---|---|---|---|
| CN | 108388683 | A | 8/2018 | |
| DE | 69511694 | T2 | 5/2000 | |
| EP | 1074306 | B1 | 2/2001 | |
| EP | 3518141 | A1 * | 7/2019 | G06V 10/811 |
| WO | WO-0195253 | A2 * | 12/2001 | G06N 3/045 |

OTHER PUBLICATIONS 3.3 Model Evaluation, Oct. 4, 2018 (Year: 2018).*

Li, "Research on Swarm Intelligent optimization algorithm of Glowworm and its application," dissertation, Hefei Univ. of Tech., 126 pp. (Apr. 22, 2017).

Li et al., "Similarity Measuring between Standards and Its Application," *J. of Shanxi Normal Univ.*, 30(4): 29-33 (Dec. 2016).

Oktay et al. "Anatomically Constrained Neural Networks (ACNNs): Application to Cardiac Image Enhancement and Segmentation," *IEEE Transactions on Medical Imaging*, 37(2): 384-395 (Sep. 26, 2017).

Ti, "Face Detection and Face Expression Recognition from Natural Scene Images," dissertation, Beijing Jiaotong Univ., 89 pp. (Mar. 16, 2018).

European Patent Office, Summons to Attend Oral Proceedings in European Patent Application No. 19153608.5, 9 pp. (Nov. 30, 2023).

* cited by examiner

MANAGING AN INSTALLED BASE OF ARTIFICIAL INTELLIGENCE MODULES

CROSS-REFERENCE TO PRIOR APPLICATION

This application is a continuation of International Patent Application No. PCT/EP2020/051049, filed on Jan. 16, 2020, which claims priority to European Patent Application No. EP 19153608.5, filed on Jan. 24, 2019. The entire disclosure of both applications is hereby incorporated by reference herein.

FIELD

The invention relates to the management of an installed base of artificial intelligence modules that may be applied in different domains serving different purposes.

BACKGROUND

In many industrial processes, a set of process parameters that act upon the process needs to be found so that some desired quantity, such as a throughput, an energy consumption or a usage of raw materials, is optimized. Most optimization solutions are built on mathematical models, the creation of which is an art that needs to be performed manually to a large extent. Mathematical models are typically tied to an individual plant, so that only little of the effort can be re-used when moving to a different plant.

Neural networks and other artificial intelligence modules may be trained automatically to an application. Based on training input data and reference data as "ground truth", the parameters that determine the behavior of the module are optimized so that when the training input data are fed into the module, the reference data are reproduced with a reasonably accuracy. After training, and optionally validation with test data, such a module can then handle a wide range of situations, including situations not envisaged when the set of training data was generated. Exemplary applications of artificial intelligence modules in industrial control applications are given in DE 695 11 694 T2 and EP 1 074 306 B1.

The training of more complex artificial intelligence modules still requires a high effort. Specifically, for a particular application, the training data that make up the "ground truth" may be a scarce resource, and/or they may not represent all situations that the artificial intelligence module is expected to handle.

SUMMARY

In an embodiment, the present invention provides a computer-implemented method for managing an installed base of multiple artificial intelligence (AI) modules, each AI module being configured to transform input data into output data by an internal processing chain, the input data comprising data that characterize a state and/or the behavior, of at least one physical plant, apparatus, or system, the behavior of the internal processing chain being determined by a set of configuration parameters trainable based on training input data and corresponding reference data to which the internal processing chain is to map the training input data, the method comprising: obtaining, from multiple AI modules and/or domains in which the AI modules are applied, pairs of input data and corresponding output data, and/or pairs of training input data and corresponding reference data, and/or configuration parameters, the data and/or parameters relating to same or sufficiently similar operating situations of the AI modules according to a predetermined quantitative similarity criterion; and aggregating the pairs of input data and corresponding output data, and/or the pairs of training input data and corresponding reference data, to form augmented training data for training one or more of the AI modules; and/or aggregating the configuration parameters to form augmented configuration parameters for configuring the internal processing chain of one or more AI modules; and/or determining, based at least in part on the pairs of input data and corresponding output data, a quantitative indicator for a performance of at least one AI module according to a predetermined quality criterion, wherein the quantitative similarity criterion is based at least in part on one or more of: at least one physical process that is controlled based on the output data produced by each AI module; a type of at least one physical quantity that forms part of the input data, the output data, the training input data, and/or the reference data of each AI module; and at least one environmental and/or geographical condition in the domain in which each AI module is applied.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
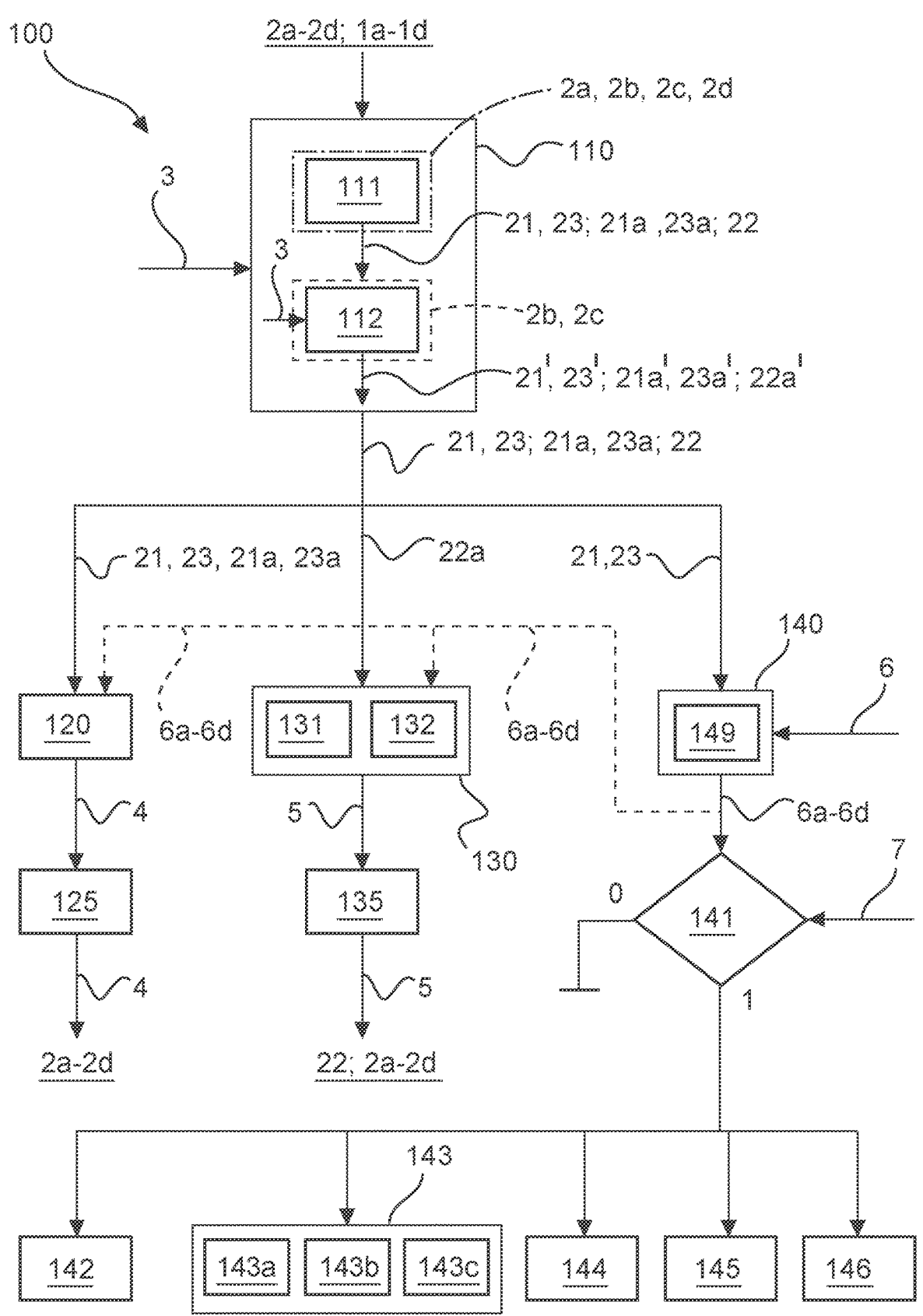
FIG. 1: Exemplary flow chart of the method 100.

In an embodiment, the present invention detects and/or remedies training deficiencies of artificial intelligence modules specifically in a setting where an installed base of such modules is to be managed as a whole even though it may span multiple industrial plants or other domains of applications, and even though the modules may be operated in different geographical locations, under different regulatory constraints, and/or by different companies.

The invention provides a method for managing an installed base of multiple artificial intelligence, AI, modules. The installed base may, for example, be regarded as a "fleet" by virtue of being under a management described herein. In each AI module in the installed base or "fleet", input data is fed into an internal processing chain of the module to transform the input data into output data. The input data comprise data that characterize the state, and/or the behavior, of at least one physical plant, apparatus or system. For example, the data may comprise physical measurement data acquired on or in the plant, apparatus or system. But alternatively or in combination, the data may also comprise synthetic data and/or external configurations. Synthetic data may, for example, comprise a maintenance history. External configurations may, for example, comprise existing operator set-points, an operating mode for the plant, apparatus, system or AI module, or any other configuration parameters that have not been obtained by training of the AI module.

The behavior of the internal processing chain is determined by a set of configuration parameters that may be trained based on training input data and corresponding reference data. The internal processing chain is to map the training input data to the reference data, and during training, the parameters may be adjusted until this mapping is done sufficiently well. Optionally, this may be checked further using validation data (comprising input data and corresponding output data) that were not part of the training data. A prime example of internal processing chains in AI modules are artificial neural networks, but the term is not limited to artificial neural networks. Rather, the term "AI module" comprises any entity with an internal processing chain whose behavior is determined by a set of trainable configuration parameters.

The reference data may be obtained from any suitable source. For example, the reference data may live in the same space as the output data, e.g., in the form of "training values" for the output data that the AI module should reproduce. In this case, a direct numerical comparison between the output data and the reference data may be performed. But alternatively or in combination, the reference data may also comprise any processing result that is obtained by feeding the output data into a physical plant or apparatus and obtaining some quantitative indicator from the plant or apparatus. For example, the output data may be set-points that are applied to low-level controllers of a distributed control system of an industrial plant. The physical processes running in the industrial plant transform these set-points into quantities, e.g., key performance indicators, KPIs, of the plant that may be used to rate whether applying said set-points had a good effect or a bad effect.

The method starts with obtaining, from multiple AI modules and/or domains in which these AI modules are applied, one or more of the following information:

pairs of input data and corresponding output data processed by the AI module;

pairs of training input data and corresponding reference data used to train the AI module;

and configuration parameters of the AI module.

The information may be in any suitable form. For example, the pairs of data may be in the form of a time series. For example, the configuration parameters may be in the form of a snapshot at a given point in time.

The only requirement is that the data and/or parameters relate to same or sufficiently similar operating situations of the AI modules according to a predetermined quantitative similarity criterion. A "quantitative similarity criterion" comprises both an indication as to one or more quantities that are to be evaluated and one or more conditions as to the values of these quantities. If the conditions are fulfilled, the quantitative similarity criterion is deemed to be met.

The domains in which the AI modules are applied may, for example, plants in which the respective AI modules reside, production processes and/or logistic processes in which the respective AI modules are used, and/or sub-processes within one and the same industrial plant.

By choosing an appropriate similarity criterion and filtering the data and/or the parameters according to this criterion, the data, and/or the parameters, from different domains of application may be combined in several advantageous manners to improve the training of the AI modules, or to at least detect deficiencies of such training in individual AI modules.

The pairs of input data and corresponding output data, and/or the pairs of training input data and corresponding reference data, may be aggregated to form augmented training data for training one or more of the AI modules. The inventors have found that this alleviates a bottleneck that is very frequently experienced when training AI modules: namely the scarcity of training data. This may comprise an overall scarcity of training data, and/or a scarcity of training data that relate to certain situations.

Depending on the application, acquiring training input data and corresponding reference data can be a time-consuming and costly process. Frequently, some manual effort is required. For example, it may be required to manually "label" training input data (such as measurement curves or images) with corresponding reference data (such as anomalies or objects that the AI module is supposed to detect in the training input data). Also, it may be cumbersome or not possible at all to purposefully drive an industrial plant into certain situations just to gather training data. For example, if realistic training data is to be gathered for an emergency shutdown situation of the plant, this comes at the price of the plant actually having to experience such a shutdown. It may then take a long time for the plant to come back up to the level of performance that existed before the shutdown. For example, if the emergency shutdown results in the venting of an ultra-high vacuum vessel, it may take days to restore the vacuum. The cost of triggering this just for the purpose of training may be too high. But if another plant with a similar AI module has experienced such an unpleasant shutdown for some other reason, and recordings of input data and output data are available, then this experience may be used as training data to train AI modules in other plants. That is, the training data that were used to train the multiple AI modules in the installed base may be "pooled".

Alternatively or in combination, the configuration parameters of multiple AI modules may be aggregated to form augmented configuration parameters for configuring the internal processing chain of one or more AI modules. In this manner, learning effort that has already been expended for multiple AI modules can be pooled. An AI module that is configured with configuration parameters aggregated from multiple AI modules may behave similarly to an AI module that has been trained with training data that has been obtained by aggregating the training data that were used to train said multiple AI modules.

In both cases, the complexity of the aggregating depends on how similar the concrete AI modules, the domains in which they are applied, and/or the operating situations are. If very similar AI modules are used in near-identical operating situations, the aggregating may comprise quite simple arithmetic operations. If there are larger differences, then the aggregating may have to level, or somehow else overcome, these differences.

Alternatively or in combination with said aggregating, a quantitative indicator for the performance of at least one AI module may be determined according to a predetermined quality criterion, based at least in part on the pairs of input data and corresponding output data. Here, the similarity criterion has the effect that the comparison between different AI modules becomes meaningful even though the AI modules may be applied in different domains (such as different plants or processes), or may even be used for different purposes. Thus, the quantitative indicator may be used to examine which of many similar AI modules work better than others. Such a comparison may be used for a variety of purposes. For example, when learning experience is being shared between different AI modules, the quantitative indicator may ensure that the experience is flowing in the right direction, e.g., from the "smarter" AI module to the "dumber" AI module making the latter "smarter", rather than "dumbing" the presently "smarter" AI module down.

In a specially advantageous embodiment, the quantitative similarity criterion is based at least in part on one or more of:

at least one objective to which each AI module is working in the domain in which it is applied;

at least one physical process that is controlled based on the output data produced by each AI module;

the type of at least one physical quantity that forms part of the input data, the output data, the training input data, and/or the reference data of each AI module;

the type of the domain in which each AI module is applied;

at least one environmental and/or geographical condition in the domain in which each AI module is applied; and at least one operating history of the domain in which each AI module is applied.

For example, one objective of an AI module may be supporting decisions for running an industrial plant or a part thereof, e.g., by outputting operating actions to be executed through actors of the plant (such as opening or closing a valve), or by outputting set-points to low-level controllers in a distributed control system. Another objective of an AI module may be analyzing the data to draw practical conclusions from it. For example, the remaining service life, and/or an imminent failure, of an asset, and/or future values of a throughput, a performance or some other desired quantity, may be predicted.

The type of physical quantities that form part of the input data, as well as the type of the domain in which each AI module is applied, mainly depend on the real-world processes with which the AI module is somehow coupled. For example, if a motor is controlled, the rotating speed, the torque, and the temperature of the motor may be suitable quantities to control and/or monitor. Vibrations may be captured by a vibration sensor attached to the motor, but they may, alternatively or in combination, just as well be captured by a vibration sensor attached to some equipment driven by the motor, such as a pump. In a reactor that processes a liquid, the composition, the temperature, and/or the pressure, of the liquid may be controlled and/or monitored. Even if the quantities processed by the AI modules are physically the same, there may be differences between the AI modules as to the data model structure.

Also, the overall scenarios in which the AI modules are used may be different. For example, similar machinery may be used in different applications or industries, such as underground mines, open-pit mines, or to produce goods such as paper. Similar plants may reside in areas where some conditions affecting their operation are different. For example, chemical processes may run differently on the shores of the Artic Sea compared with running in the desert. Equipment may run differently depending on whether it is running inside a protected factory or outdoors with exposure to the weather. A rocket launch will work differently depending on the degree of geographic latitude because the latitude determines how much the launch is assisted by the rotation of the Earth.

The operating history may, for example, comprise snapshots of configuration parameters, and/or time series of input data, output data, training input data, and/or reference data. Alternatively or in combination, the operating history may also comprise an alarm log, and/or an event log, and/or any other written or electronic records of past operations.

It depends on the concrete application at hand which constituents of the similarity criterion will be chosen and how they will be weighted relative to one another. No matter which concrete similarity criterion is chosen, the basic teaching remains the same: reduce the problem of pooling data and/or configuration parameters from multiple AI modules, and/or a quantitative comparison between the performances of multiple AI modules, to the problem of finding an appropriate quantitative similarity criterion.

The data, and/or the parameters, may be collected from different AI modules right from the start in a manner that they fulfil the quantitative similarity criterion. But the data, and/or the parameters, may also be collected in an unsorted manner first and sorted later. In a further specially advantageous embodiment, first the data, and/or the parameters, are obtained from a first set of AI modules. Then, from the so-obtained data and/or parameters, data, and/or parameters, from a second set of AI modules are selected. The second set of AI modules is a subset of the first set, and the selection is performed so that the then-obtained data and/or parameters relate to the same or sufficiently similar operating situations according to the predetermined quantitative similarity criterion. The obtaining of data and the selecting from the data may also alternate within the method.

In a further specially advantageous embodiment, the pairs of input data and corresponding output data, and/or the pairs of training input data and corresponding reference data, and/or the configuration parameters, are selected and/or weighted in the aggregating according to the quantitative indicator for the performance of the AI module to which they relate. In this manner, when the result of such aggregating is applied to an AI module, it is made more likely that the quantitative performance of the domain, entity or plant in which this AI module is applied will be improved. Specifically, the aggregating of data and/or configuration parameters from AI modules that each have their strengths in different operating situations is facilitated. For example, one trained AI module may have the best experience to operate a plant under normal conditions, whereas another trained AI module may do an average job under normal conditions, but excel in unexpected crisis situations.

In a specially advantageous embodiment, at least one AI module is trained and/or retrained with the augmented training data. Such training and/or retraining may further improve an existing training, but it may just as well start from scratch, e.g., by erasing an already existing set of configuration parameters. In this manner, the AI module will be trained with a much larger quantity of training data, and this augmented set of training data will also be more diverse in terms of different operating situations.

A similar effect will arise when, alternatively or in combination, the internal processing chain of at least one AI module is configured with the augmented configuration parameters. This may be faster than training the AI module with the augmented training data because all the computational effort that has already gone into the training of the individual AI modules is re-used at least partially.

A main application of determining the quantitative indicator for the performance of an AI module is to take action for improvement in case the performance of any modules is found wanting. In a specially advantageous embodiment, in response to determining that the quantitative indicator for the performance of at least one AI module meets a predetermined condition (such as, e.g., falling short of a predetermined threshold), one or more of the following actions may be taken with respect to the AI module that has been found wanting, but alternatively or in combination also with respect to one or more other AI modules:

The configuration parameters of at least one AI module may be reset. This may, for example, be appropriate if a training of the AI module has gone wrong and somehow misguided it to performing worse, rather than better. The AI module may then be retrained. But such retraining may also build upon an already existing training, so that the AI module does not need to be taken offline for the time a complete retraining from scratch takes. The retraining may, for example, be done using augmented training data as described above, but alternatively or in combination, it may also comprise a training on some fixed set of pairs of training input data and corresponding reference data that can, for example, be regarded as some "minimal syllabus" that all AI modules of a particular type should undergo in training. Alternatively or in combination, the retraining may also be performed using pairs of training input data and corresponding reference data from at least one AI module for which the quantitative indicator for the performance is better than for the to-be-retrained AI module.

The configuration parameters of at least one AI module may be changed to include predetermined additional knowledge. This may be done, for example, using augmented configuration parameters, but alternatively or in combination, it may also, for example, comprise some fixed impact on the configuration parameters that reflects a "minimum knowledge" every AI module of a particular type should have after training.

Learning experience may be transferred from at least one AI module for which the quantitative indicator for the performance is better to another AI module for which the quantitative indicator for the performance is worse. For example, this transfer may happen in the form of changing the configuration parameters of the worse-performing AI module. In this manner, the knowledge may propagate throughout the installed base of AI modules, without stopping at the boundaries of organizations.

An AI module for which the quantitative indicator for the performance is worse may be replaced with an AI module for which the quantitative indicator for the performance is better. Such a replacement may entail physically replacing a hardware module. But the replacement may also be effected by merely replacing the configuration parameters of the old AI module with the configuration parameters of the new AI module. No matter how the replacement is done, it is a particularly quick fix to get a sub-optimal performance of an AI module remedied without spending much time delving into the root cause first.

Preferably, the aggregating of configuration parameters, and/or the transferring of learning experience, is performed by a Bayesian approach, and/or by "transfer learning". Both approaches are particularly suitable for taking differences between the operating situations of the AI modules into account, so that the probability is increased that the performance is actually improved as intended.

In a specially advantageous embodiment, the quality criterion according to which the quantitative indicator for the performance is rated comprises a key performance indicator, KPI, of the domain in which the AI module is applied. Such a KPI may, for example, be a KPI of a plant in which the AI module resides. For example, a value of the KPI may go into the quantitative indicator. This is particularly useful if the AI module is used to somehow decide on the further running of the plant, such as by suggesting actions and/or new set-points for low-level controllers.

In a further specially advantageous embodiment, the KPI may be abstracted into a canonical form on the site of the domain in which the AI module is applied, e.g., on the site of the plant in which the AI module resides. The effect of this is two-fold. First, the canonical form may be better comparable between different plants or other domains. Second, abstracting the KPI improves the privacy of the owner of the plant or other domain because it gives less of the business purpose of this owner away.

In a further specially advantageous embodiment, the quality criterion according to which the quantitative indicator for the performance is rated comprises a statistical quantity that includes feedback from ground truth with which the AI module was trained. For example, this statistical quantity may go into the quantitative indicator. This is particularly advantageous if the AI module is used primarily for analysis of the input data to draw a conclusion from them, as detailed above. The statistical quantity may comprise one or more of:

an F1 score;

an F2 score;

a confusion matrix with true positives, true negatives, false positives and false negatives;

precision and recall; and other metrics as implemented in machine learning libraries, such as scikit-learn.

In a further specially advantageous embodiment, at least one AI module is interfaced with one or more of: a motor, an electrical drive, a pump, an electrical power train, a heat exchanger, a chemical reactor, a chemical analyzer, an automation controller device, a process module of a modular industrial plant, a production machine, a sensor that measures physical measurement data (e.g., for use as input data), or another industrial equipment or subsystem. These components are quite generic components that occur in very many different plants, so that even after applying the quantitative similarity criterion, a large base will remain from which to source data and/or configuration parameters for aggregating.

The method may be computer-implemented at least in part. Therefore, a software embodiment is a useful separate product that brings about the effect of improving the overall performance of an installed base of AI modules. Therefore, the invention also provides a computer program with machine-readable instructions that, when executed by one or more computers, and/or by an industrial control system, cause the one or more computers, and/or the industrial control system, to perform the method described above. The invention also provides a non-transitory machine-readable storage medium, and/or a download product, with the computer program.

FIG. 1 shows a flow chart of an exemplary embodiment of the method 100. In this example, the different domains 1a-1d in which the AI modules 2a-2d are applied are different plants in which they reside. In step 110, pairs of input data 21 and corresponding output data 22, and/or pairs of training input data 21a and corresponding reference data 23a, and/or configuration parameters 22a are obtained from multiple AI modules 2a-2d, and/or from the plants 1a-1d in which these AI modules 2a-2d reside. The gathered data 21, 23; 21a, 23a, and/or the gathered parameters 22a, relate to same or sufficiently similar operating situations of the AI modules 2a-2d, according to a predetermined quantitative similarity criterion 3. One exemplary way to achieve is to first gather data from all AI modules 2a, 2b, 2c, 2d according to block 111, and then select, according to block 112, only the data 21', 23'; 21a', 23a', and/or the configuration parameters 22a', from a subset 2b, 2c of the AI modules 2a-2d, so that the similarity criterion 3 is met.

In step 120, the pairs of input data 21 and corresponding output data 23, and/or the pairs of training input data 21a and corresponding reference data 23a, may be aggregated to form augmented training data 4 for training AI modules 2a-2d. That is, the so-obtained augmented training data 4 may be built from training data 21a, 23a that were used to train the individual AI modules 2a-2d, from real-world experience 21, 23 gathered during operation of the individual AI modules 2a-2d, or from any suitable mixture of the two. AI modules 2a-2d may be trained using the augmented training data 4 in step 125.

In step 130, the configuration parameters 22a may be aggregated to form augmented configuration parameters 5. Exemplary ways to achieve this are a Bayesian approach according to block 131, or transfer learning according to block 132. The augmented configuration parameters 5 represent a more refined product of the learning experience of the individual AI modules 2a-2d in that at least part of the computational effort that has gone into the training of the AI modules 2a-2d is preserved and re-used when applying these augmented configuration parameters 5 to internal processing chains 22 of AI modules 2a-2d, as per optional step 135. The augmented configuration parameters 5 are immediately usable by the AI module 2a-2d and improve its behavior. By contrast, if augmented training data 4 are transferred to an AI module 2a-2d, the AI module 2a-2d will still have to perform a learning process on these augmented training data 4 before the real-world performance of the AI module 2a-2d changes.

According to step 140, based on the real-world input-output behavior of the AI modules 2a-2d, quantitative indicators 6a-6d for the performance of these modules may be determined according to a predetermined quality criterion 6 that may, for example, comprise a KPI of the plant 1a-1d where the AI module 2a-2d resides. Optionally, according to block 149, this KPI may be abstracted into a canonical form on the site of the plant 1a-1d, so as to improve both the comparability of KPIs across plants 1a-1d and the privacy of plant owners.

Optionally, the quantitative indicators 6a-6d may be fed into the aggregating 120 of the pairs of input data 21 and corresponding output data 23, and/or the pairs of training input data 21a and corresponding reference data 23a. Optionally, the quantitative indicators 6a-6d may be fed into the aggregating 130 of configuration parameters 22a. For example, the quantitative indicators 6a-6d may be used as selection criteria and/or as weights to ensure that data coming from better-performing AI modules 2a-2d are preferred in the aggregating 120, 130. The aggregating 120, 130 may even be limited to AI modules 2a-2d for which the respective quantitative indicators 6a-6d meet at least one predetermined criterion.

At diamond 141, it may be determined whether the quality indicators 6a-6d meet a predetermined condition 7, such as falling short of a threshold. If the condition 7 is met (truth value 1 at diamond 141), various actions may be taken alone or in combination.

In step 142, the configuration parameters 22a of at least one AI module 2a-2d may be reset.

In step 143, at least one AI module 2a-2d may be retrained. This may be performed:

using a predetermined set of pairs of training input data 21a and corresponding reference data 23a, so as to enforce a "minimum syllabus" (block 143a);

using augmented training data 4, so as to benefit from pooled learning experience (block 143b); and/or using pairs of training input data 21a and corresponding reference data 23a from at least one AI module for which the quantitative indicator 6a-6d for the performance is better than for the to-be-retrained AI module

2a-2d, so as to make "stronger" AI modules 2a-2d help "weaker" modules 2-2d (block 143c).

In step 144, the configuration parameters 22a of at least one AI module 2a-2d may be changed to include predetermined additional knowledge, so as to enforce a "minimum knowledge" that the AI module 2a-2d should have.

In step 145, learning experience from at least one AI module 2a-2d for which the quantitative indicator 6a-6d for the performance is better may be transferred to another AI module 2a-2d for which the quantitative indicator 6a-6d for the performance is worse. This again makes "stronger" AI modules 2a-2d help the "weaker" ones.

In step 146, an AI module 2a-2d for which the quantitative indicator 6a-6d for the performance is worse may be replaced with an AI module 2a-2d for which the quantitative indicator 6a-6d for the performance is better. This is a relatively quick fix for a lagging performance that does not require a detailed search for a root cause.

With the method 100, detecting and/or remedying deficiencies in the performance of AI modules 2a-2d basically boils down to choosing an appropriate similarity criterion 3, an appropriate quality criterion 6, a condition 7, and optionally the concrete steps to take in order to improve the behavior of AI modules 2a-2d. These choices may be made by a data scientist, but they may also be automated by means of a configurable automated decision function.

Figure 2:
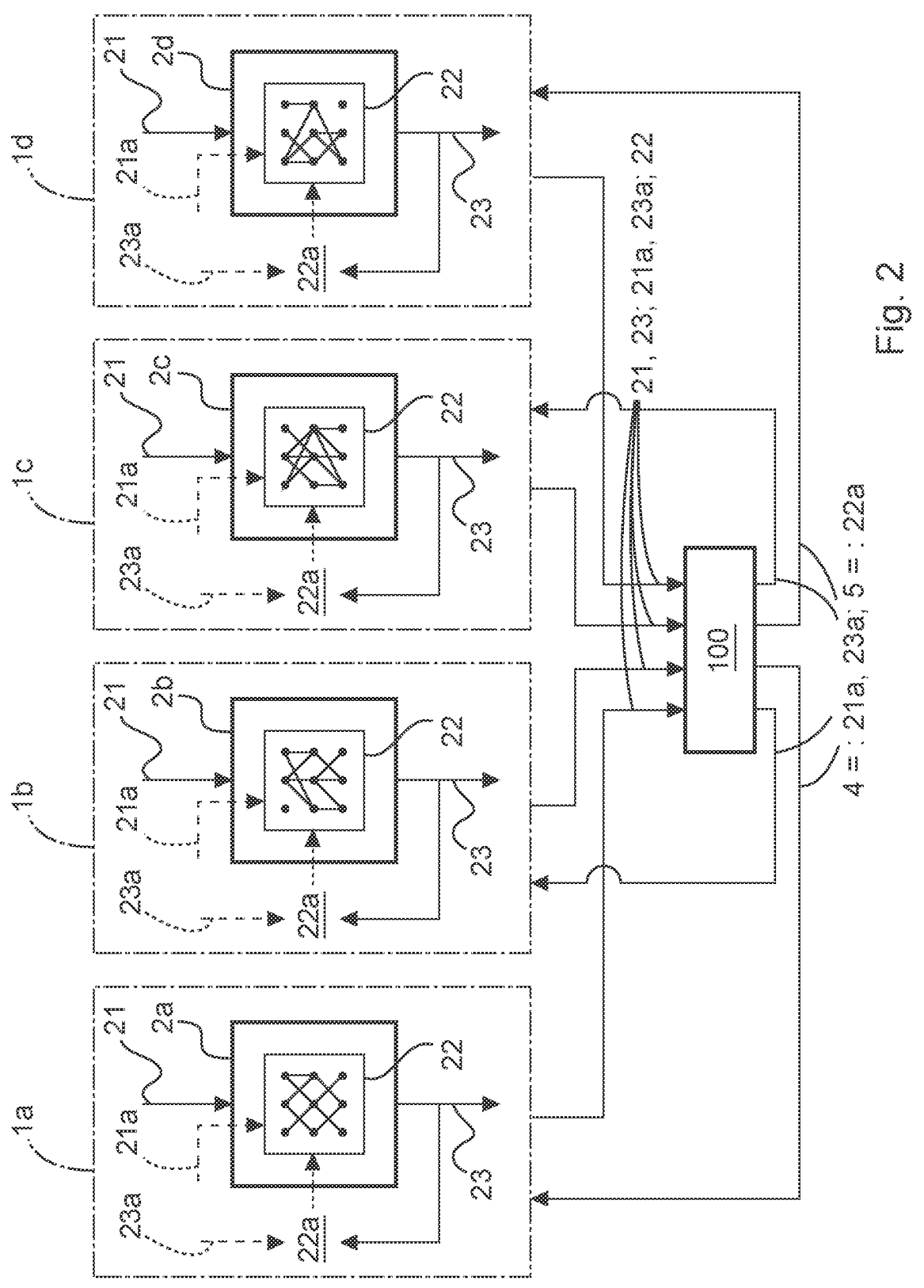
FIG. 2: Exemplary setting in which the method 100 may be applied.

FIG. 2 shows an exemplary setting where the method 100 may be applied. In this toy example, there are four plants 1a-1d, with each plant 1a-1d containing only one single respective AI module 2a-2d. In reality, each plant 1a-1d will comprise very many different AI modules 2a-2d.

Each AI module 2a-2d has an internal processing chain 22 that processes input data 21 into output data 23. The behavior of each internal processing chain 22 is determined by respective configuration parameters 22a. In the example of FIG. 2, the internal processing chains 22 are implemented as neural networks, and the configuration parameters 22a represent weights of these networks.

Each AI module 2a-2d is trained using training input data 21a. Output data 23 produced from training input data 21a is compared with reference data 23a representing the "ground truth", and this feedback is used to update the configuration parameters 22a.

As discussed before, the reference data 23a may be obtained from any suitable source. For example, the reference data 23a may live in the same space as the output data 23, e.g., in the form of "training values" for the output data 23 that the AI module 2a-2d should reproduce. In this case, a direct numerical comparison between the output data 23 and the reference data 23a may be performed. But alternatively or in combination, the reference data 23a may also comprise any processing result that is obtained by feeding the output data 23 into a physical plant or apparatus and obtaining some quantitative indicator from the plant or apparatus.

Pairs of input data 21 and output data 23, and/or pairs of training input data 21a and reference data 23a, and/or configuration parameters 22a, are gathered in the course of the method 100 as described above. As a result of the method 100, augmented training data 4, may be fed back into one or more AI modules 2a-2d to be used there as new or additional training data 21a, 23a. Alternatively or in combination, augmented configuration parameters 5 may be fed into one or more AI modules 2a-2d to be used there as new or additional configuration parameters 22a.

The disclosure of the present application also includes the following Example:

A method for managing an installed base of multiple artificial intelligence, AI, modules, wherein each AI module transforms input data into output data by means of an internal processing chain, wherein said input data comprise data that characterize the state, and/or the behavior, of at least one physical plant, apparatus or system, wherein the behavior of said internal processing chain is determined by a set of configuration parameters that may be trained based on training input data and corresponding reference data to which the internal processing chain is to map the training input data, the method comprising the following steps:

> obtaining, from multiple AI modules and/or domains in which these AI modules are applied, pairs of input data and corresponding output data, and/or pairs of training input data and corresponding reference data, and/or configuration parameters, wherein the data and/or parameters relate to same or sufficiently similar operating situations of the AI modules according to a predetermined quantitative similarity criterion; and
>
> aggregating the pairs of input data and corresponding output data, and/or the pairs of training input data and corresponding reference data, to form augmented training data for training one or more of the AI modules; and/or
>
> aggregating the configuration parameters, to form augmented configuration parameters for configuring the internal processing chain of one or more AI modules; and/or
>
> determining, based at least in part on the pairs of input data and corresponding output data, a quantitative indicator for the performance of at least one AI module according to a predetermined quality criterion.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1a-1d domains, such as plants, where AI modules 2a-2d are applied
2a-2d AI modules
21 input data for AI modules 2a-2d
21' subset of input data 21
21a training input data for AI modules 2a-2d
21a' subset of training input data 21a
22 internal processing chains of AI modules 2a-2d
22a configuration parameters of AI modules 2a-2d
22a' subset of configuration parameters 22a
23 output data from AI modules 2a-2d
23' subset of output data 23
23a reference data for AI modules 2a-2d
23a' subset of reference data 23a
3 quantitative similarity criterion
4 augmented training data produced by method 100
5 augmented configuration parameters produced by method 100
6 quality criterion for assessing performance of AI modules 2a-2d
6a-6d quantitative indicators for performances of AI modules 2a-2d
7 predetermined condition for quantitative indicators 6a-6d
100 method
110 gathering data and/or configuration parameters from AI modules 2a-2d
111 gathering from full set of AI modules 2a-2d
112 reducing gathered information to subset 21', 21a', 22a', 23', 23a'
120 producing augmented training data 4
125 applying augmented training data 4 to AI modules 2a-2d
130 producing augmented configuration parameters 5
131 Bayesian approach
132 transfer learning
135 applying augmented parameters 5 to AI modules 2a-2d
140 determining quantitative indicators 6a-6d
141 comparing quantitative indicators 6a-6d with criterion 7
142 resetting configuration parameters 22a of AI module 2a-2d
143 retraining AI module 2a-2d
143a retraining 143 with predetermined training data
143b retraining 143 with augmented training data 4
143c retraining 143 with training data of better-performing module 2a-2d
144 changing configuration parameters 22a of AI module 2a-2d
145 transferring learning experience between AI modules 2a-2d
146 replacing AI module 2a-2d with a better-performing one
149 abstracting KPIs

What is claimed is:

1. A computer-implemented method for managing an installed base of multiple artificial intelligence (AI) modules, each AI module being configured to transform input data into output data by an internal processing chain, the input data comprising data that characterize a state and/or a behavior of at least one physical plant, apparatus, or system, a behavior of the internal processing chain being determined by a set of configuration parameters trainable based both on training input data and corresponding reference data to which the internal processing chain is to map the training input data, the method comprising:

obtaining, from multiple AI modules and domains in which each of the AI modules are applied to interface with a physical asset, pairs of input data and corresponding output data, and/or pairs of training input data and corresponding reference data, and/or configuration parameters, the data and/or parameters relating to same or sufficiently similar operating situations of the AI modules by filtering out the pairs of input data and corresponding output data, and/or the pairs of training input data and the corresponding reference data, and/or the configuration parameters obtained from the multiple AI modules according to a predetermined quantitative similarity criterion; and aggregating the pairs of input data and corresponding output data, and/or the pairs of training input data and corresponding reference data, to form augmented training data for training one or more of the AI modules; and/or aggregating the configuration parameters to form augmented configuration parameters for configuring the internal processing chain of one or more AI modules;

determining, based at least in part on the pairs of input data and corresponding output data, a quantitative indicator for a performance of at least one AI module according to a predetermined quality criterion; and determining that the quantitative indicator for the performance of at least one AI module meets a predetermined condition, and in response:

transferring learning experience from at least one AI module for which the quantitative indicator for the performance is better and that interfaces with a first physical asset to another AI module for which the quantitative indicator for the performance is worse and that interfaces with a second physical asset; or replacing an AI module for which the quantitative indicator for the performance is worse and that interfaces with a first physical asset with an AI module for which the quantitative indicator for the performance is better and that interfaces with a second physical asset, wherein the quantitative similarity criterion is based at least in part on one or more of:

at least one physical process that is controlled based on the output data produced by each AI module;

a type of at least one physical quantity that forms part of the input data, the output data, the training input data, and/or the reference data of each AI module; and at least one environmental and/or geographical condition in the domain in which each AI module is applied.

2. The method of claim 1, wherein the quantitative similarity criterion is based at least in part on one or more of:

at least one objective on which each AI module is working in the domain in which the AI module is applied;

a type of the domain in which each AI module is applied; and at least one operating history of the domain in which each AI module is applied.

3. The method of claim 1, wherein the obtaining of the data and/or the parameters, comprises:

obtaining the data and/or the parameters from a first set of AI modules as first obtained data and/or parameters; and selecting, from the first obtained data and/or parameters, data and/or parameters from a second set of AI modules that is a subset of the first set as second obtained data and/or parameters, so that the second obtained data and/or parameters relate to same or sufficiently similar operating situations according to the predetermined quantitative similarity criterion.

4. The method of claim 1, wherein the pairs of input data and corresponding output data, and/or the pairs of training input data and corresponding reference data, and/or the configuration parameters, are selected and/or weighted in the aggregating according to the quantitative indicator for the performance of the AI module to which they relate.

5. The method of claim 1, further comprising:

training and/or retraining at least one AI module with the augmented training data; and/or configuring the internal processing chain of at least one AI module with the augmented configuration parameters.

6. The method of claim 1, wherein determining that the quantitative indicator for the performance of at least one AI module meets the predetermined condition, and responding further comprises:

resetting the configuration parameters of at least one AI module; and/or retraining at least one AI module; and/or changing the configuration parameters of at least one AI module to include predetermined additional knowledge.

7. The method of claim 6, wherein the retraining of the at least one AI module is performed using:

a predetermined set of pairs of training input data and corresponding reference data;

augmented training data; and/or pairs of training input data and corresponding reference data from at least one AI module for which the quantitative indicator for the performance is better than for the at least one AI module.

8. The method of claim 1, wherein the aggregating of configuration parameters and/or a transferring of learning experience is performed by a Bayesian approach and/or by transfer learning.

9. The method of claim 1, wherein the quality criterion for determining the quantitative indicator comprises a key performance indicator (KPI) of the domain in which the AI module is applied.

10. The method of claim 9, further comprising:

abstracting, on a site of the domain in which the AI module is applied, the KPI into a canonical form.

11. The method as claimed in claim 9, wherein the predetermined quantitative similarity criterion is based on the similarity between the first physical asset and the second physical asset, and wherein the KPI is based on a performance of the respective AI module with respect to the first physical asset.

12. The method of claim 1, wherein the quality criterion for determining the quantitative indicator comprises a statistical quantity that includes feedback from ground truth with which the AI module was trained.

13. The method of claim 12, wherein the statistical quantity comprises one or more of:

an F1 score;

an F2 score;

a confusion matrix with true positives, true negatives, false positives, and false negatives;

precision and recall; and other metrics as implemented in machine learning libraries comprising scikit-learn.

14. The method of claim 1, wherein at least one AI module is interfaced with one or more of the physical assets, the physical assets comprising one or more of: a motor, an electrical drive, a pump, an electrical power train, a heat exchanger, a chemical reactor, a chemical analyzer, an automation controller device, a process module of a modular industrial plant, a production machine, a sensor configured to measure physical measurement data, or another industrial equipment or subsystem.

15. A non-transitory machine-readable storage medium comprising machine-readable instructions that, when executed by one or more computers, and/or by an industrial control system, cause the one or more computers, and/or the industrial control system, to perform the method of claim 1.

16. The method as claimed in claim 1, wherein the second physical asset corresponds to a same type of device and/or system as the first physical asset.

17. A computer-implemented method for managing an installed base of multiple artificial intelligence (AI) modules, each AI module being configured to transform input data into output data by an internal processing chain, the input data comprising data that characterize a state and/or a behavior of at least one physical plant, apparatus, or system, a behavior of the internal processing chain being determined by a set of configuration parameters trainable based both on training input data and corresponding reference data to which the internal processing chain is to map the training input data, the method comprising:

obtaining, from multiple AI modules and domains in which each of the AI modules are applied to interface with a physical asset, pairs of input data and corresponding output data, and/or pairs of training input data and corresponding reference data, the pairs of input data and output data and/or pairs of training input data and reference data relating to same or sufficiently similar operating situations of the AI modules by filtering out the pairs of input data and corresponding output data, and/or the pairs of training input data and the corresponding reference data obtained from the multiple AI modules according to a predetermined quantitative similarity criterion;

aggregating the pairs of input data and corresponding output data, and/or the pairs of training input data and corresponding reference data, to form augmented training data for training one or more of the AI modules;

determining, based at least in part on the pairs of input data and corresponding output data, a quantitative indicator for a performance of at least one AI module according to a predetermined quality criterion; and determining that the quantitative indicator for the performance of at least one AI module meets a predetermined condition, and in response:

transferring learning experience from at least one AI module for which the quantitative indicator for the performance is better to another AI module for which the quantitative indicator for the performance is worse; or replacing an AI module for which the quantitative indicator for the performance is worse with an AI module for which the quantitative indicator for the performance is better, wherein the quantitative similarity criterion is based at least in part on one or more of:

at least one physical process that is controlled based on the output data produced by each AI module;

a type of at least one physical quantity that forms part of the input data, the output data, the training input data, and/or the reference data of each AI module; and at least one environmental and/or geographical condition in the domain in which each AI module is applied.

18. A computer-implemented method for managing an installed base of multiple artificial intelligence (AI) modules, each AI module being configured to transform input data into output data by an internal processing chain, the input data comprising data that characterize a state and/or a behavior of at least one physical plant, apparatus, or system, a behavior of the internal processing chain being determined by a set of configuration parameters trainable based both on training input data and corresponding reference data to which the internal processing chain is to map the training input data, the method comprising:

obtaining, from multiple AI modules and domains in which each of the AI modules are applied to interface with a physical asset, pairs of input data and corresponding output data, and/or pairs of training input data and corresponding reference data, and configuration parameters, the parameters and pairs of input data and output data and/or pairs of training input data and reference data relating to same or sufficiently similar operating situations of the AI modules by filtering out the pairs of input data and corresponding output data, and/or the pairs of training input data and the corresponding reference data, and the configuration parameters obtained from the multiple AI modules according to a predetermined quantitative similarity criterion;

aggregating the pairs of input data and corresponding output data, and/or the pairs of training input data and corresponding reference data, to form augmented training data for training one or more of the AI modules;

aggregating the configuration parameters to form augmented configuration parameters for configuring the internal processing chain of one or more AI modules;

determining, based at least in part on the pairs of input data and corresponding output data, a quantitative indicator for a performance of at least one AI module according to a predetermined quality criterion; and determining that the quantitative indicator for the performance of at least one AI module meets a predetermined condition, and in response:

transferring learning experience from at least one AI module for which the quantitative indicator for the performance is better to another AI module for which the quantitative indicator for the performance is worse; or replacing an AI module for which the quantitative indicator for the performance is worse with an AI module for which the quantitative indicator for the performance is better, wherein the quantitative similarity criterion is based at least in part on one or more of at least one physical process that is controlled based on the output data produced by each AI module;

a type of at least one physical quantity that forms part of the input data, the output data, the training input data, and/or the reference data of each AI module; and at least one environmental and/or geographical condition in the domain in which each AI module is applied.

* * * * *